(12) United States Patent
Chien

(10) Patent No.: US 6,393,445 B1
(45) Date of Patent: May 21, 2002

(54) SYSTEM FOR TRANSFORMING CHINESE CHARACTER FORMS IN REAL-TIME BETWEEN A TRADITIONAL CHARACTER FORM AND A SIMPLIFIED CHARACTER FORM

(75) Inventor: Ha Chun Chien, Taipei (TW)

(73) Assignee: Institute For Information Industry, Taipei (TW)

( * ) Notice: Subject to any disclaimer, the term of this patent is extended or adjusted under 35 U.S.C. 154(b) by 0 days.

(21) Appl. No.: 09/753,505

(22) Filed: Jan. 4, 2001

(51) Int. Cl.[7] .............................................. G06F 17/21
(52) U.S. Cl. ........................ 707/536; 707/535; 707/542
(58) Field of Search ................................. 707/535, 536, 707/542; 382/185

(56) References Cited

U.S. PATENT DOCUMENTS

| | | | | |
|---|---|---|---|---|
| 4,829,583 A | * | 5/1989 | Monroe et al. | 382/185 |
| 5,109,352 A | * | 4/1992 | O'Dell | 707/542 |
| 5,119,296 A | * | 6/1992 | Zheng et al. | 707/535 |
| 5,255,189 A | * | 10/1993 | Woo | 707/535 |
| 5,309,358 A | * | 5/1994 | Andrews et al. | 709/1 |
| 5,999,706 A | * | 12/1999 | Chrosny | 358/1.11 |
| 6,028,959 A | * | 2/2000 | Wang et al. | 382/185 |
| 6,275,611 B1 | * | 8/2001 | Parthasarathy | 382/187 |
| 6,279,828 B1 | * | 8/2001 | Fann | 235/462.01 |
| 6,314,469 B1 | * | 11/2001 | Tan et al. | 709/245 |

OTHER PUBLICATIONS

Adams, "Internationalization and character set standards", StandardView, vol. 1, Issue 1, Sep. 1993, pp. 31–39.*
Qiao et al., "Six–digit coding method", Communications of the ACM, vol. 33, Issue 5, May 1990, pp. 491–494.*

* cited by examiner

Primary Examiner—Stephen S. Hong
(74) Attorney, Agent, or Firm—Bacon & Thomas, PLLC

(57) ABSTRACT

A system for transforming Chinese characters in real-time between a first character form and a second character form is disclosed, which has: a first operating means of first Chinese character codes, a first graphic library; a second code operating means of second Chinese characters, a second graphic library; and an index switching means. When the inputted Chinese is in first character form, the index switching means finds the related index values of second Chinese character form, according to the index values of first Chinese character form obtained from the first code operating means, then uses the second graphic library to display the second Chinese character form from graphics for the related index value on the information apparatus.

7 Claims, 8 Drawing Sheets

SYSTEM FOR TRANSFORMING CHINESE CHARACTER FORMS IN REAL-TIME BETWEEN A TRADITIONAL CHARACTER FORM AND A SIMPLIFIED CHARACTER FORM

BACKGROUND OF THE INVENTION

1. Field of the Invention

The present invention relates to a transforming system for inputting Chinese character forms and, more particularly, to a system for transforming Chinese characters in real-time between a traditional character form and a simplified character form.

2. Description of Related Art

Generally speaking, an information apparatus with Chinese inputting/displaying functionality must have coding Chinese character technology to process Chinese data. However, the Chinese character form system has two different character forms: traditional Chinese character and simplified Chinese character. Therefore, they each have their own coding modes, a Big 5 coding mode for the traditional Chinese character form and a GB coding mode for the simplified Chinese character form, respectively. Please refer to FIG. 1. FIG. 1 is a schematic diagram of a displaying system for traditional Chinese characters and simplified Chinese characters of a prior art information apparatus. Traditional Chinese characters and simplified Chinese characters both are encoded in double-byte coding mode, however, each has its own coding rule. Taking 「發」 this traditional Chinese character as an example, the traditional character form code of the 「發」 character in the drawing is B0,B1. Afterward, an addressing means switch the character form code into an addressing function f(B0, B1) of a traditional Chinese character. Finally, a character graphic of 「發」 character is displayed by performing the addressing function f(B0, B1) to obtain an index value of character graphics and find its corresponding character graphic. Similarly, the displaying system of a simplified Chinese character uses the same manner to present input character data. With the development and popularity of Internet technology, users utilizing the different Chinese character forms cannot completely understand information presented in another Chinese character form on the Internet. However, existing transforming program of Chinese character forms only provide Chinese character form transformation for text files, such as Microsoft Word 2000. For this reason, the user needs to download a webpage in a text file first and use transforming software to switch the Chinese character form by himself. Another choice is to install extra software with a transforming program to switch the Chinese character form. Nevertheless, this extra software is not applied to the general embedded system or information apparatus. Furthermore, there are some websites which provide programs or webpages in both traditional Chinese characters and simplified Chinese characters for the user to choose, however, a lot of unnecessary repeated data will be stored in the server of the website. Please refer to FIG. 2. FIG. 2 is a schematic diagram of a transforming system 20 for traditional Chinese characters and simplified Chinese characters of a prior art information apparatus. The transforming system 20 for traditional Chinese characters and simplified Chinese characters of the prior art information apparatus comprises four different Chinese character form graphic libraries. Two of the Chinese character form graphic libraries are a traditional Chinese character graphic library 21 and a simplified Chinese character graphic sub-library 22, both arranged according to the sequence of traditional Chinese characters. The other two of the Chinese character form graphic libraries are a traditional Chinese character graphic library 23 and a simplified Chinese character graphic sub-library 24 both arranged according to the sequence of simplified Chinese characters. When the traditional Chinese characters are inputted as data, the transforming system 20 obtains a corresponding simplified Chinese character from the simplified Chinese character graphic sub-library 22 according to the character code of the traditional Chinese characters. Similarly, when the simplified Chinese characters are inputted as data, the transforming process is still the same. Hence, the prior art transforming system 20 for Chinese characters needs four different Chinese character form graphic libraries to store the characters form, which occupies too much memory capacity and results in increasing manufacturing costs. Another prior art method is using a code-converting table to switch the character code with each other, then to obtain the corresponding character. For example, the traditional character code of 「發」 character is B0,B1. This process switches the B0,B1 into a related simplified Chinese character code G0,G1 of 「發」 character, then performs an addressing function g(G0,G1) to obtain an index value of character graphics and find its corresponding character graphic. This process needs more time for searching the code-converting table and calculating the index value once more, which not only wastes time but also slows the transforming speed.

Therefore, it is desirable to provide an improved character recognition method to mitigate and/or obviate the aforementioned problems.

SUMMARY OF THE INVENTION

The object of the present invention is to provide a system for transforming Chinese characters in real-time between a traditional character form and a simplified character form displayed on an information apparatus to enable a user to switch Chinese character forms between a tradition character form and a simplified character form in real-time, when processing document data or surfing on the Internet, thus making it more convenient for the user to read Chinese information in any kind of Chinese character forms.

Another object of the present invention is to provide a system for transforming Chinese characters in real-time between a traditional character form and a simplified character form which only needs little memory capacity to utilize limited memory space efficiently, thus allowing the transforming system to be used for general electric appliances having small memory capacities.

To achieve the object, the system of the present invention includes: a first operating means of first Chinese character codes for performing an addressing function for a first Chinese character form according to a code of the first Chinese character to obtain an index value of a corresponding first Chinese character; a first graphic library for storing a plurality of different first Chinese character form graphics; a second code operating means of second Chinese characters, for performing an addressing function for a second Chinese character form according to a code of the second Chinese character to obtain an index value of a corresponding first Chinese character; a second graphic library for storing a plurality of different second Chinese character form graphics; and an index switching means for Chinese character forms, the switching means storing a plurality of index values of first Chinese characters for receiving the index values of first Chinese characters obtained from the first code operating means, and transforming the index value of first Chinese characters into related index values of second Chinese characters.

Other objects, advantages, and novel features of the invention will become more apparent from the following detailed description when taken in conjunction with the accompanying drawings.

DETAILED DESCRIPTION OF THE PREFERRED EMBODIMENT

The present invention provides a system 30 for transforming Chinese characters in real-time between a traditional character form and a simplified character form, the system enables the Chinese characters displayed on an information apparatus to switch immediately between the traditional form and the simplified form. The traditional Chinese character and the simplified Chinese character are both coded using a double-byte font.

Figure 1:
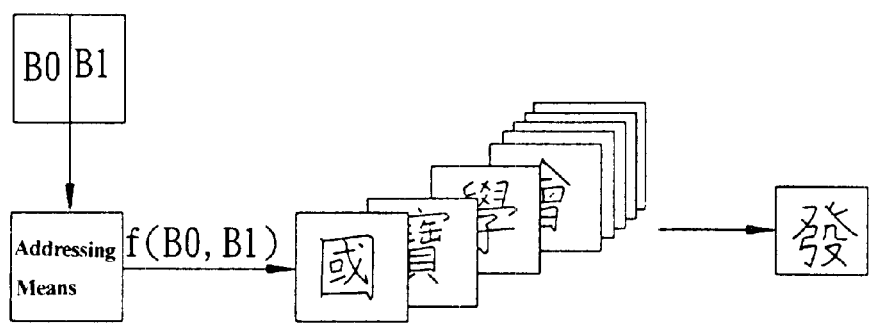
FIG. 1 is a schematic diagram of a displaying system for traditional Chinese characters and simplified Chinese characters of a prior art information apparatus.
Figure 1:
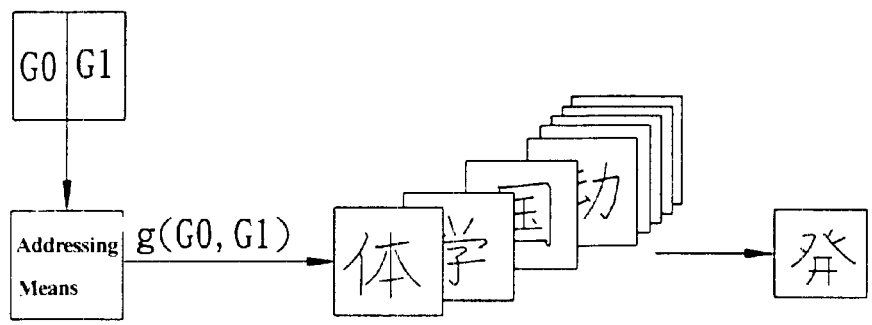
Figure 2:
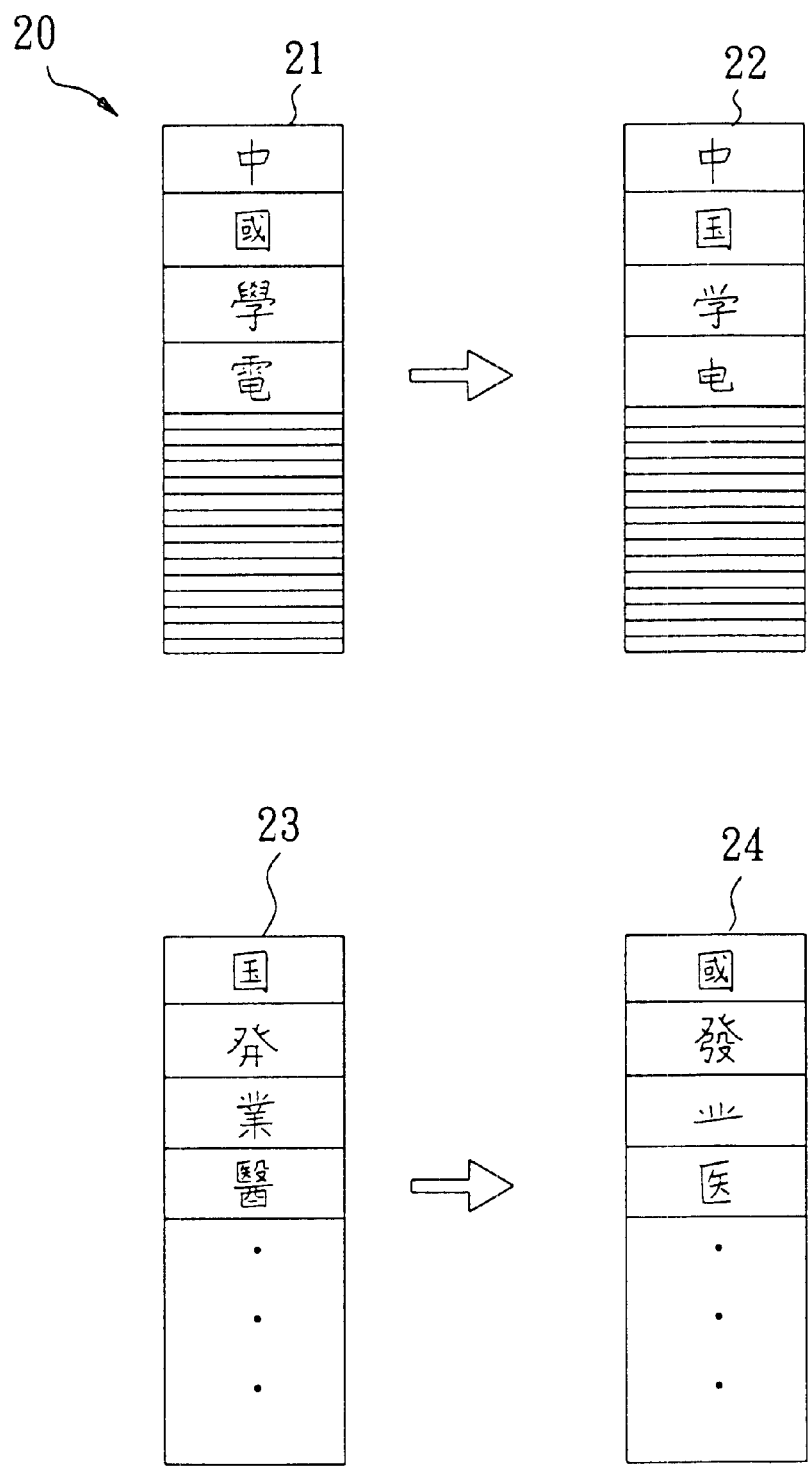
FIG. 2 is a schematic diagram of a transforming system for traditional Chinese characters and simplified Chinese characters of a prior art information apparatus.
Figure 3:
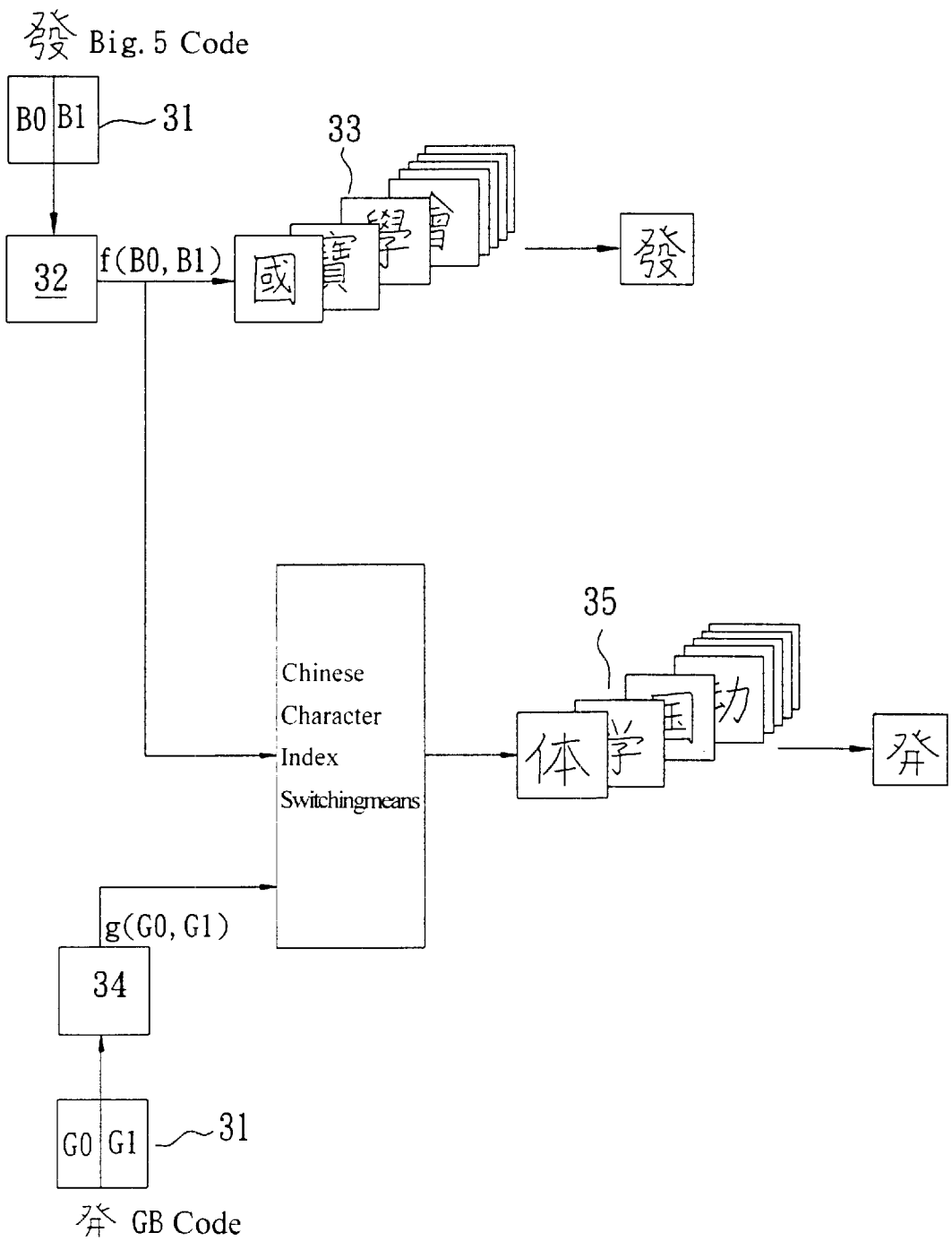
FIG. 3 is a schematic diagram of structure of a real-time transforming system for traditional Chinese characters and simplified Chinese characters of an information apparatus according to the present invention.
Figure 4:
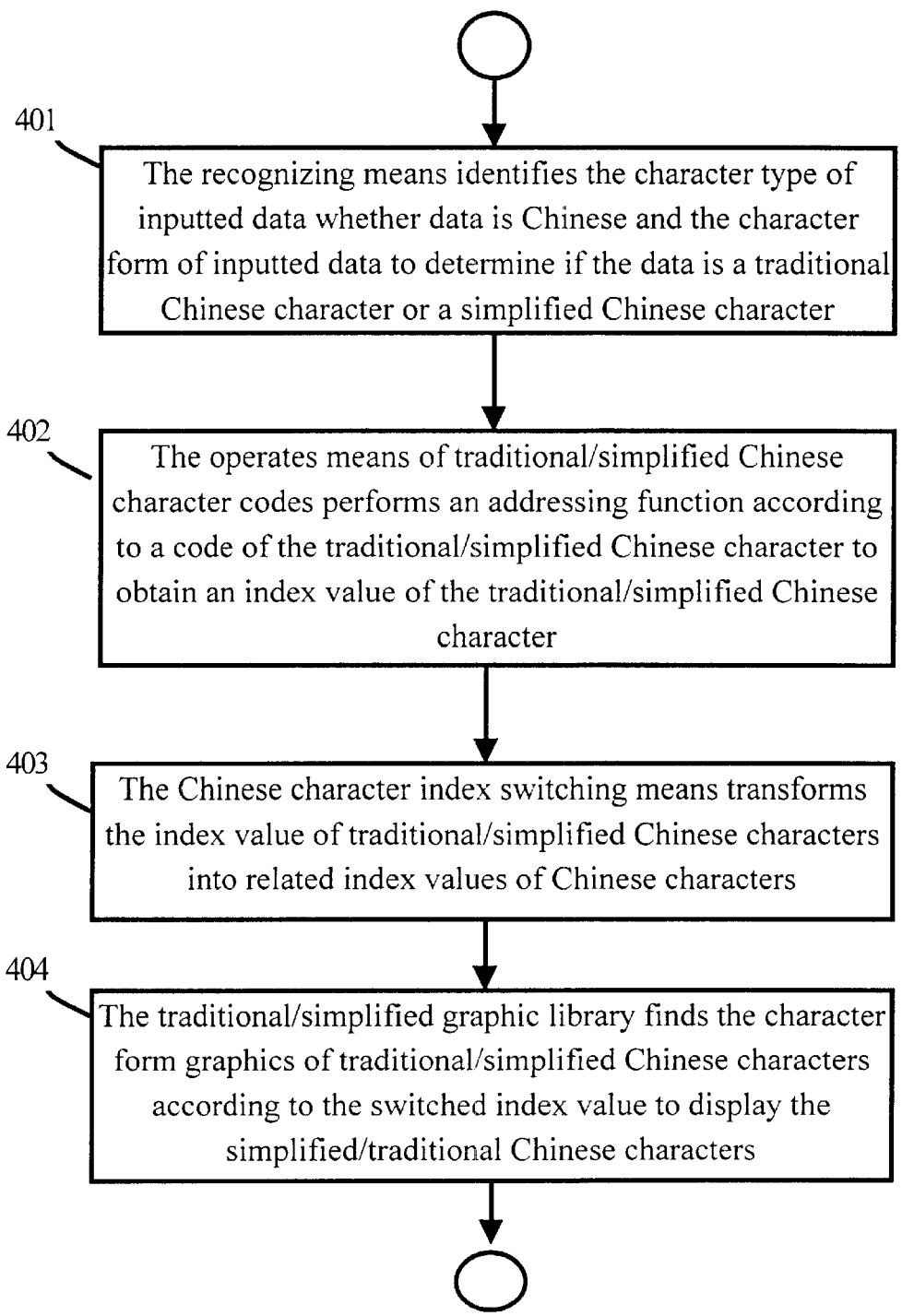
FIG. 4 is a flowchart of the real-time transforming system for traditional Chinese characters and simplified Chinese characters of the information apparatus according to the present invention.

For a more detailed explanation, a preferred embodiment is presented below. The transforming system 30 of the present invention comprises a recognizing means 31, an operating means of traditional Chinese character codes 32, a traditional Chinese character form graphic library 33, a code operating means of simplified Chinese characters 34, a simplified Chinese character form graphic library 35 and a Chinese character index switching means 36. The code operating means of traditional/simplified Chinese characters 32,34 are used for performing an addressing function f(B0, B1)/ g(G0,G1)for a traditional/simplified Chinese character form according to a code of the traditional/simplified Chinese character to obtain an index value of a corresponding traditional/simplified Chinese character. The traditional/ simplified graphic libraries 33,35 are used for storing a plurality of different traditional/simplified Chinese character form graphics, and they each have their own arrangement sequence.. Please refer to FIG. 3 and FIG. 4. FIG. 3 is a schematic diagram of structure of a real-time transforming system 30 for traditional Chinese characters and simplified Chinese characters of an information apparatus according to the present invention. FIG. 4 is a flowchart of the real-time transforming system 30 for traditional Chinese characters and simplified Chinese characters of the information appa- ratus according to the present invention. When an information apparatus installed with the real-time transforming system 30 of the present invention receives a character data, the recognizing means 31 identifies the character type of the input data, whether the data is Chinese, and the character form of the input data to determine if the data is a traditional Chinese character or a simplified Chinese character (Please refer to the step 401 in FIG. 4). As shown in FIG. 3, when the input character data is a traditional Chinese character, the operating means of traditional Chinese character codes 32 performs an addressing function f(B0,B1) for a traditional Chinese 「憂」 character form according to a B0,B1 code of the traditional Chinese 「憂」 character, to obtain an index value of a traditional Chinese 「憂」 character (Please refer to the step 402 in FIG. 4). The traditional graphic library 33 is used for storing a plurality of different traditional Chinese character form graphics. According to the obtained index value of a traditional Chinese 「憂」 character, the traditional graphic library 33 displays a character form graphic for the traditional Chinese 「憂」 character.

The Chinese character index switching means 36 is composed of an array data structure, the elements of the array are the index values for every Chinese character of both traditional Chinese character form graphic library and simplified Chinese character form graphic library, which arrange according to the index value sequence of one of two Chinese character forms. And the switch action is followed by a Index Mapping method. The array of the Chinese character index switching means 36 is showed as Ary[ ], when a user wants to switch the traditional Chinese character form to the simplified Chinese character form, the index value obtained by the operating means of traditional Chinese character codes 32 performing the addressing function f(B0,B1) is 100. The Chinese character index switching means 36 processes Ary[100] to find the index values of simplified Chinese 「憂」 characters (Please refer to the step 403 in FIG. 4). Finally, the simplified graphic library 35 displays the character form graphics of second Chinese characters according to the related index values of the simplified Chinese 「憂」 character (Please refer to the step 404 in FIG. 4). Similarly, when the inputted character data is in a simplified Chinese character form, the real-time transforming system 30 of the present invention still can switch the simplified Chinese characters to the related traditional Chinese characters by the same above mentioned steps.

Figure 5:
FIG. 5 shows a Taiwan website coded in traditional Chinese character form.
Figure 6:
FIG. 6 shows the Taiwan website of FIG. 5 in simplified Chinese character form after being transformed by the system of the present invention.
Figure 7:
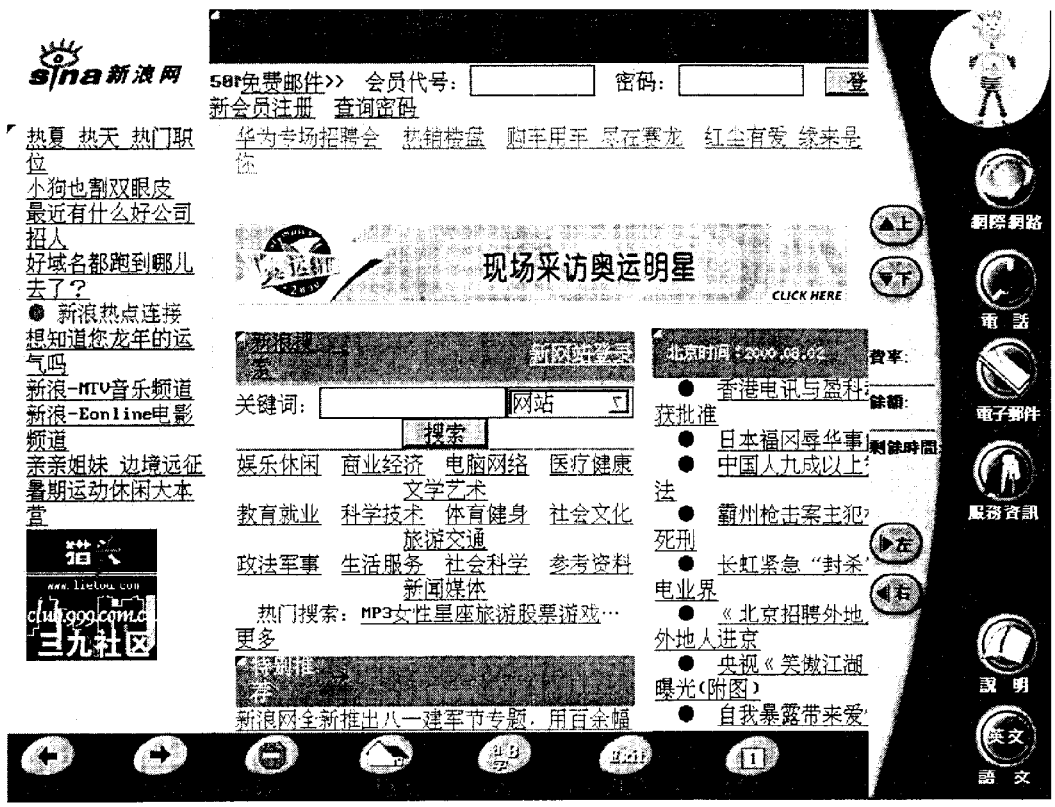
FIG. 7 shows a China website coded in simplified Chinese character form.
Figure 8:
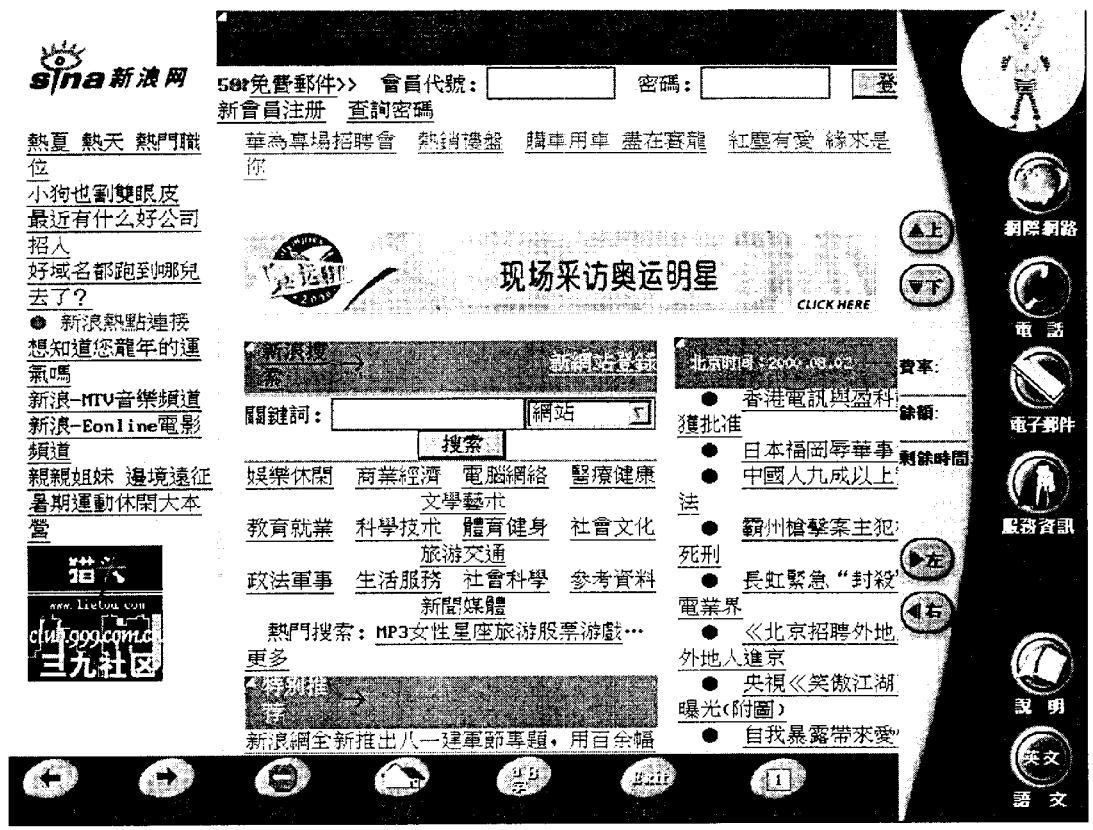
FIG. 8 shows the China website of FIG. 7 in traditional Chinese character form after being transformed by the system of the present invention.

Please refer to FIG. 5 to FIG. 8. FIG. 5 shows a Taiwan website coded in traditional Chinese character form. FIG. 6 shows the Taiwan website of FIG. 5 in simplified Chinese character form after being transformed by the system of the present invention. FIG. 7 shows a China website coded in simplified Chinese character form. FIG. 8 shows the China website of FIG. 7 in traditional Chinese character form after being transformed by the system of the present invention.

The real-time transforming system 30 for traditional Chinese characters and simplified Chinese characters of the present invention enables the user to switch the Chinese data displayed on the webpages on the Internet between the traditional character form and the simplified character form, so that users utilizing the different Chinese character forms can completely understand the information presented in any kind of Chinese character form on the Internet. Furthermore, the real-time transforming system 30 of the present invention only needs the traditional Chinese character form graphic library 33 and the simplified Chinese character form graphic library 35 to provide the display of the traditional Chinese character form and the simplified Chinese character form. Therefore, the real-time transforming system 30 use small memory capacity which reduces the cost and increases the speed.

The computer program should perform the above-mentioned transforming system 30 of the present invention. The system of the present invention can be stored as a computer program on a computer readable medium such as a hard disk, a floppy disk, an integrated circuit, a compact disk and others computer readable media. Therefore, it is unnecessary to describe more about the technology of the programming process.

Although the present invention has been explained in relation to its preferred embodiment, it is to be understood that many other possible modifications and variations can be made without departing from the spirit and scope of the invention as hereinafter claimed.

What is claimed is:

1. A system for transforming Chinese characters in real-time between a first character form and a second character form, the system enabling the Chinese characters displayed on an information apparatus to switch immediately between the first form and the second form, the Chinese characters in the first form and the Chinese characters in the second form being coded in a predetermined rule respectively, the system comprising:

a first operating means of first Chinese character codes for performing an addressing function for a first Chinese character form according to a code of the first Chinese character to obtain an index value of the first Chinese character;

a first graphic library for storing a plurality of different first Chinese character form graphics;

a second code operating means of second Chinese characters, for performing an addressing function for a second Chinese character form according to a code of the second Chinese character to obtain an index value of the second Chinese character;

a second graphic library for storing a plurality of different second Chinese character form graphics; and an index switching means for the Chinese character forms, the switching means storing a plurality of index values of first Chinese characters and a plurality of index values of second Chinese characters for receiving the index values of first Chinese characters obtained from the first code operating means, and transforming the index value of first Chinese characters into related index values of second Chinese characters;

wherein when the inputted Chinese is in first character form, the index switching means finds the related index values of second Chinese character form according to the index values of first Chinese character form obtained from the first code operating means, then uses the second graphic library to display the second Chinese character form from graphics for the related index value on the information apparatus.

2. The system of claim 1, wherein the system is produced directly on a memory chip.

3. The system of claim 2, wherein the memory chip used is for information apparatus.

4. The system of claim 1, wherein the system is utilized in a browsing program.

5. The system of claim 1, wherein the first Chinese character form and the second Chinese character form are both coded using a double-byte font.

6. The system of claim 1 further comprising a recognizing means for identifying the character type of inputted data, whether data is Chinese, and the character form of inputted data to determine if the data is a first Chinese character form or a second Chinese character form.

7. The system of claim 1, wherein the first character form is a traditional Chinese character form and the second character form is a simplified Chinese character form, or the first character form is the simplified Chinese character form and the second character form is the traditional Chinese character form.

* * * * *